United States Patent
Harrison

(10) Patent No.: US 7,287,519 B2
(45) Date of Patent: Oct. 30, 2007

(54) METHOD AND APPARATUS FOR FUEL INJECTION SYSTEMS

(76) Inventor: John Blakemore Harrison, 216 Whitford Road, Howick, Auckland (NZ)

( * ) Notice: Subject to any disclaimer, the term of this patent is extended or adjusted under 35 U.S.C. 154(b) by 0 days.

(21) Appl. No.: 10/531,741

(22) PCT Filed: Oct. 21, 2003

(86) PCT No.: PCT/NZ03/00234

§ 371 (c)(1), (2), (4) Date: Apr. 18, 2005

(87) PCT Pub. No.: WO2004/036022

PCT Pub. Date: Apr. 29, 2004

(65) Prior Publication Data

US 2006/0130796 A1 Jun. 22, 2006

(30) Foreign Application Priority Data

Oct. 21, 2002 (NZ) .................. 522153

(51) Int. Cl.
F02M 35/10 (2006.01)
(52) U.S. Cl. .................... 123/527; 123/184.21
(58) Field of Classification Search ........... 123/184.21, 123/527, 525, 27 GE
See application file for complete search history.

(56) References Cited

U.S. PATENT DOCUMENTS 2,781,752 A * 2/1957 Van Den Bussche ....... 123/525
4,829,957 A * 5/1989 Garretson et al. ...... 123/27 GE

FOREIGN PATENT DOCUMENTS

RU 1777630 11/1992

* cited by examiner

Primary Examiner—Stephen K. Cronin
Assistant Examiner—Hyder Ali
(74) Attorney, Agent, or Firm—Senniger Powers

(57) ABSTRACT

An apparatus (100) for a gaseous fuel injection system includes a first chamber (15b) connectable with a source of gaseous fuel at a required inlet pressure, a second chamber (15c) connectable with an engine or other apparatus so as to supply gaseous fuel thereto and further connected with said first chamber (15b) through a controllable valving means. A flow control means (25) has an inlet connectable with the first chamber (15b) and an outlet connectable with an orifice (25b) for controlling the pressure at the outlet of the flow control means (25) to be no more than 53% of the inlet pressure. The apparatus (100) further includes means (20) for detecting the outlet pressure and controlling the valving means, such that controlling the said flow control means (25) to adjust the flow of gaseous fuel therethrough controls the outlet pressure, which in turn controls the controllable valving means and the pressure in the second chamber (15c), so as to thereby control the flow of gaseous fuel to said engine or other apparatus.

18 Claims, 5 Drawing Sheets

METHOD AND APPARATUS FOR FUEL INJECTION SYSTEMS

TECHNICAL FIELD

The present invention relates to methods and apparatus for fuel injection systems, and in particular, but not exclusively, to a method and apparatus for controlling the flow of CNG or LPG to an internal combustion engine.

BACKGROUND ART

The present invention relates to a method and apparatus for use in fuel injection systems, which term is used to describe such systems in all types of uses, industrial, vehicular, domestic and the like.

With the increasing worldwide concerns relating to pollution, the use of electronically controlled fuel injection systems for vehicle engines and in industrial applications such as boilers, is becoming increasingly popular. This is due to their superiority in providing a close control of fuel/air ratios which in turn controls the amount of pollution resulting from the vehicle or boiler exhaust for example.

In order to control the flow of gaseous fuel in a fuel injection system, there is a problem in finding a solenoid valve or other control means which will be large enough to control a sufficient volume of gas while at the same time be able to operate at a high enough speed. The larger the gas flow, the larger and slower the solenoid valve or the like needs to be.

OBJECTS OF THE INVENTION

It is therefore an object of the present invention to provide a method and/or apparatus for use in a gaseous fuel injection system which will overcome or at least ameliorate problems with such methods or apparatus to date, or which at least will provide the public with a useful choice.

It is an alternative object to provide a feedback controlled regulator stage which will overcome or ameliorate problems with such regulators at present, or which will at least provide the public with a useful choice.

DISCLOSURE OF THE INVENTION

According to a first aspect of the present invention there is provided an apparatus for a gaseous fuel injection system including:
(i) A first chamber including an inlet connectable with a source of gaseous fuel at a required inlet pressure;
(ii) A second chamber connectable with an engine or other apparatus so as to supply gaseous fuel thereto and further connected with said first chamber through a controllable valving means;
(iii) A flow control means having an inlet connectable with said first chamber and an outlet connectable with an orifice means for controlling the pressure at the outlet of said flow control means to be no more than 53% of the inlet pressure;
(iv) Detection means for detecting said outlet pressure and controlling said valving means;
(v) The arrangement being such that controlling the said flow control means to adjust the flow of gaseous fuel therethrough controls the said outlet pressure which in turn controls said controllable valving means and the pressure in said second chamber, so as to thereby control the flow of gaseous fuel to said engine or other apparatus.

Preferably, in use, the pressure in said second chamber may be maintained at less than 53% of said pressure in said first chamber.

Preferably, said fluid control means may be a high speed solenoid valve.

Preferably, said controllable valving means may include a valve body separating said first and second chambers and a first diaphragm having a first side in fluid communication with said first and said second chambers, said diaphragm adapted to provide a variable opening between said first side of said first diaphragm and said valve body for said gas to flow from said first chamber to said second chamber via said valve body, wherein said opening varies in response to said outlet pressure of said flow control means.

Preferably, said first diaphragm may include a second side opposite said first side and in fluid communication with a third chamber, wherein said variable opening of said controllable valving means is varied by varying a pressure in said third chamber.

Preferably, said pressure in said third chamber may be varied by varying an opening of a valve between said third chamber and said second chamber.

Preferably, said opening of said valve between said third chamber and said second chamber may be controlled by a second diaphragm having a first side in fluid communication with said third chamber and a second side opposite said first side in fluid communication with a fourth chamber which is in fluid communication with gas from said outlet of said fluid control means.

Preferably, said valve between said third chamber and said second chamber may include a needle with a tapered notch.

Preferably, said apparatus may include an acceleration stage diaphragm having a first side in fluid communication with said outlet of said flow control means and a second side opposite said first side in fluid communication with an intake manifold of said engine or other apparatus downstream of a throttle valve of said engine or other apparatus, wherein said acceleration stage diaphragm deflects towards said first side of said acceleration stage diaphragm when a pressure in said intake manifold increases, thereby increasing said pressure in said fourth chamber and increasing said opening of said variable valve.

Preferably, said apparatus may include a feedback controlled regulator stage between said inlet and said first chamber.

Preferably, said feedback controlled regulator stage may include a first second stage chamber having an second stage inlet, the first second stage chamber in fluid communication with a second second stage chamber via a second stage controllable valving means, an outlet from said second second stage chamber connectable with said first chamber, a second stage diaphragm controlling said second stage controllable valving means and in fluid communication with said second second stage chamber on a first side and a feedback chamber on an opposite second side, wherein a pressure of the gas in said feedback chamber is controlled by a feedback regulator means which varies said pressure in response to a pressure of the gas in said second stage outlet, thereby maintaining said pressure in said second stage outlet at a substantially constant pressure.

According to a second aspect of the present invention there is provided a method of controlling the flow of gaseous fuel in a fuel injection apparatus, said method including:
(i) Providing a first chamber connectable with a source of gaseous fuel at a required inlet pressure;

(ii) Providing a second chamber connectable with an engine or other apparatus and in gas flow connection with said first chamber through a controllable valving means;

(iii) Providing a flow control means having an inlet connected with said first chamber to receive gaseous fuel therefrom and an outlet connected with a first orifice means so adapted that the outlet pressure of said flow control means is no greater than 53% of the said inlet pressure;

(iv) Said method further including the control of said gaseous fuel flow by said flow control means, so as to control the said outlet pressure and detecting said outlet pressure and controlling said valving means in response to said outlet pressure so as to control the pressure in said second chamber and therefrom the gaseous fuel flow to said engine or other apparatus from said second chamber.

Preferably, the method may include maintaining the pressure in said second chamber at less than 53% of the pressure in said first chamber.

Preferably, said flow control means may be a high speed solenoid valve.

Preferably, said controllable valving means may include a valve body provided between said first and second chambers and a first diaphragm adapted to control the flow between said first and second chambers through said valve body by means of a variable opening between said first diaphragm and said valve body, the method including varying said variable opening of said controllable valving means by varying a pressure on an opposite side of said diaphragm to said valve body.

Preferably, the method may include providing a feedback controlled regulator stage between said inlet and said first chamber.

According to a third aspect of the present invention there is provided an apparatus for a gaseous fuel injection system utilising the method of any one of the five immediately preceding paragraphs.

According to a fourth aspect of the present invention there is provided a feedback controlled regulator stage including a first chamber having an inlet connectable to a source of gas at a substantially constant pressure, the first chamber in fluid communication with a second chamber via a controllable valving means, an outlet from said second chamber, a second stage diaphragm controlling said controllable valving means and in fluid communication with said second chamber on a first side and a feedback chamber on an opposite second side, wherein a pressure of a gas in said feedback chamber is controlled by a feedback regulator means which varies said pressure in response to a pressure of the gas in said outlet, thereby maintaining said pressure in said outlet at a substantially constant pressure.

According to a fifth aspect of the present invention there is provided an apparatus for a gaseous fuel injection system substantially as herein described with reference to the accompanying Figures.

According to a sixth aspect of the present invention there is provided a feedback controlled regulator stage substantially as herein described with reference to FIG. 1.

According to a seventh aspect of the present invention there is provided a method of controlling the flow of gaseous fuel in a fuel injection apparatus substantially as herein described.

Further aspects of this invention which should be considered in all its novel aspects will become apparent from the following description given by way of example of possible embodiments thereof and in which reference is made to the very diagrammatic illustrations of a preferred embodiment in the accompanying drawings.

BEST MODE FOR CARRYING OUT THE INVENTION

As mentioned above, a particular problem with gaseous fuel injection systems is to be able to control a relative large gas flow without using correspondingly large and relatively slow control apparatus and in particular large and slow solenoid operated apparatus.

In attempting to deal with this problem the present invention has made use of an application of Bernoulli's Principle which in the present context can be summarised as follows:

(a) In general, the mass flow of a gas through an orifice is proportional to the square root of the pressure differential across the orifice, except where;

(b) The absolute outlet pressure of the orifice is not more than 53% of the absolute inlet pressure, a state often referred to as "choked flow" by those skilled in the art, when the mass flow will be proportional to the square root of the absolute inlet pressure alone. In this case the pressure required to produce a given mass flow is proportional to the flow squared.

In utilising the above physical law, the present invention seeks to ensure that the absolute outlet pressure at the outlet orifice of a gas flow control means is never more than 53% of the absolute inlet pressure, which will mean that the flow is kept constant for a particular flow control means setting. By then detecting and using the outlet pressure to control the pressure in a chamber supplying the gas to the engine or boiler or the like, a very small gas flow through the flow control means can then control a very much larger gas flow to the engine or boiler or the like. It follows therefore that the flow control means can be a relatively small and fast device in that it is only controlling a small gas flow, although it is in fact then controlling a very much larger gas flow.

Figure 1:
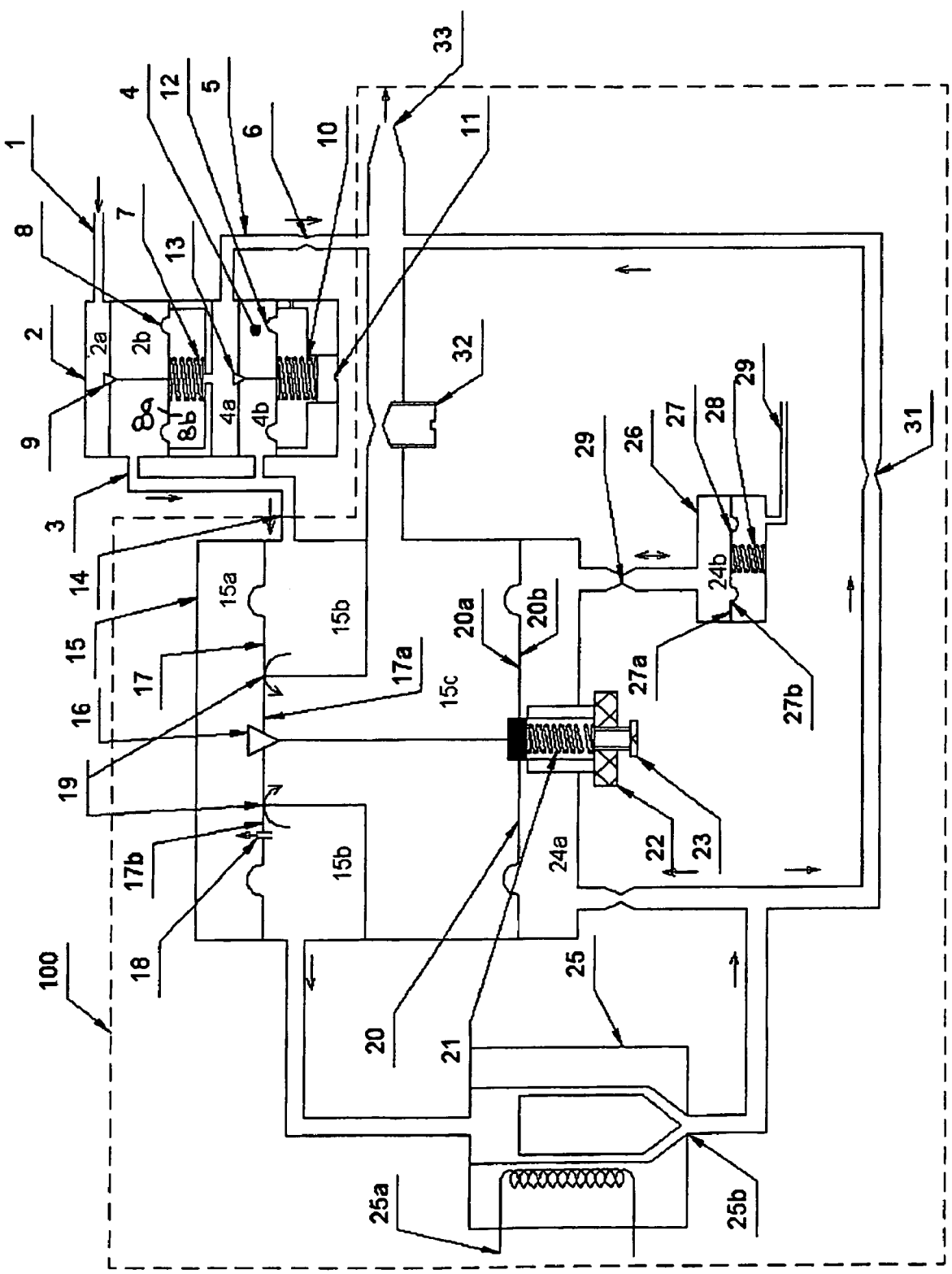
FIG. 1: shows, very diagrammatically, a preferred embodiment of the invention.

Referring first to FIG. 1, gas is supplied at a substantially constant pressure to an inlet port 1. For automotive applications the gas may typically be stored at high pressure in a cylinder (not shown) and may be reduced in pressure by a first stage regulator (not shown) to a pressure of, for example, around 700 kPa. The first stage regulator may, if necessary, be water heated to avoid freezing of the mechanism.

The gas enters a second regulator stage 2, which in the embodiment shown is a feedback controlled regulator stage, through an electrically operated lock off solenoid valve (not shown) which is fitted prior to the second stage inlet port 1.

The second regulator stage 2 reduces the gas pressure to, for example, around 276 kPa, by passing the gas from a first second stage chamber 2a to a second second stage chamber 2b via a control valve 9. The pressure of the gas in the second second stage chamber 2b applies a load on a first side 8a of a second stage diaphragm 8 which acts against a second stage spring 7. This action closes the second stage valve 9 when the required pressure in the second second stage chamber 2b has been reached.

As gas flows out of the second second stage chamber 2b through a port 3 to the main gaseous fuel injection apparatus 100, the pressure in the second second stage chamber 2b drops. The force of the second stage spring 7 is then greater than the force created by the gas pressure on the first side 8a of the second stage diaphragm 8. The second stage spring 7 opens a second stage valve 9 and gas enters the second second stage chamber 2b from the first second stage chamber 2a until equilibrium is restored.

If a high gas demand from the main fuel injection system 100 causes the gas pressure in the main apparatus inlet port 14, first chamber 15b and first feedback chamber 4b to fall below the target pressure of around 276 kPa, a condition known as "droop" to those skilled in the art, then the pressure against a feedback regulator diaphragm 12 falls and reduces the compression load on a feedback spring 10, which in turn opens a feedback control valve 13. Gas flows from the first feedback chamber 4b into a second feedback chamber 4a and acts on the second side 8b of the second stage diaphragm 8. The force on the second side 8b of the second stage diaphragm 8 is additional to the force of the second stage spring 7, and this action increases the pressure output of the second regulator stage 2.

When the desired pressure in the port 14, first chamber 15b and first feedback chamber 4b is restored, a feedback diaphragm 12 in the first feedback chamber 4b compresses a feedback spring 10 and closes the feedback control valve 13 between the first feedback chamber 4b and second feedback chamber 4a.

The gas in the second feedback chamber 4a is drained via a port 5, restrictor 6, and via an electrically operated lock off solenoid valve (not shown) fitted prior to the gas discharge pipe 33.

The second regulator stage therefore uses feedback from the output port 3 of the second stage to ensure that the pressure supplied to the inlet port 14 of the main gaseous fuel injection system 100 remains substantially constant regardless of the flow out of the main system 100, that is, it ensures that the supply pressure does not "droop". The output the second regulator stage 2 is therefore substantially stable and constant in pressure under all demand conditions.

Those skilled in the art will appreciate that other regulator configurations of regulator may also provide a sufficiently stable output for use with the present invention. Those skilled in the art will also appreciate that the feedback regulator stage described above need not necessarily be a "second stage" regulator, that is, it need not necessarily provide the second drop in pressure from the gas source. In some embodiments of the feedback regulator it may be used as a "first" stage, a "third stage", or in any position where feedback control of the output of the regulator or regulator stage is required.

As is described in further detail below, the main injection apparatus 100 operates by controlling the gas flow from a first chamber 15b to a second chamber 15c by varying a much smaller flow through a flow control means 25, detecting the pressure of the smaller flow downstream of the flow control means 25 with a second diaphragm 20, and controlling the flow through a controllable valving means based on that pressure to provide a required pressure in the second chamber 15c. The controllable valving means includes a first diaphragm 17 and a valve body 19. A first side 17a of the first diaphragm 17 is in fluid communication with the first chamber 15b and second chamber 15c. The opening between the first diaphragm 17 and the valve body 19 can be varied to provide a required flow of gas, as is described further below.

Gas enters the main injection apparatus 100 via the main inlet port 14 into a first chamber 15b. From the first chamber 15b a portion of the gas passes via a control orifice 18 in the first diaphragm 17 into a third chamber 15a, while the remainder of the gas passes through a flow control means 25, which may, for example, be a standard petrol engine fuel injector.

In the illustrated embodiment of this invention the control means 25 is in the form of a solenoid valve with its coil 25a illustrated, through which the controlling electrical pulses will be supplied so as to switch the solenoid valve rapidly on and off. Such small very high speed solenoids (HSS) will be well known to those skilled in the engineering arts, typical examples being Bosch model No 0-280-150-215 or model HSV3000 of Servojet Products International, these being given solely by way of example only and merely indicative of possible types of high speed solenoid valve which may be used.

Those skilled in the art will recognise that other control means 25 may be suitable for some embodiments of the present invention, particularly where speed of response is not as critical as is the case for supplying gas to a vehicle engine. Alternative valves such as servo operated proportional valves may be suitable in some instances.

The flow control means 25 is typically actuated by a square wave modulated electronic signal from a vehicle's engine management control computer, or from a host computer or micro processor, to the injector coil 25a.

By varying the frequency and pulse width of the electronic signal to the injector 25a a varying sonic choked flow reference pressure is supplied to a fourth chamber 24a, and optionally to a fifth chamber 24b via an orifice 30. This reference pressure is applied to the second side 20b of a second diaphragm 20 which opens a valve 16 in the first diaphragm 17 of the controllable valve means. A first side 20a of the second diaphragm 20 is in fluid communication with the second chamber 15c.

Figure 2:
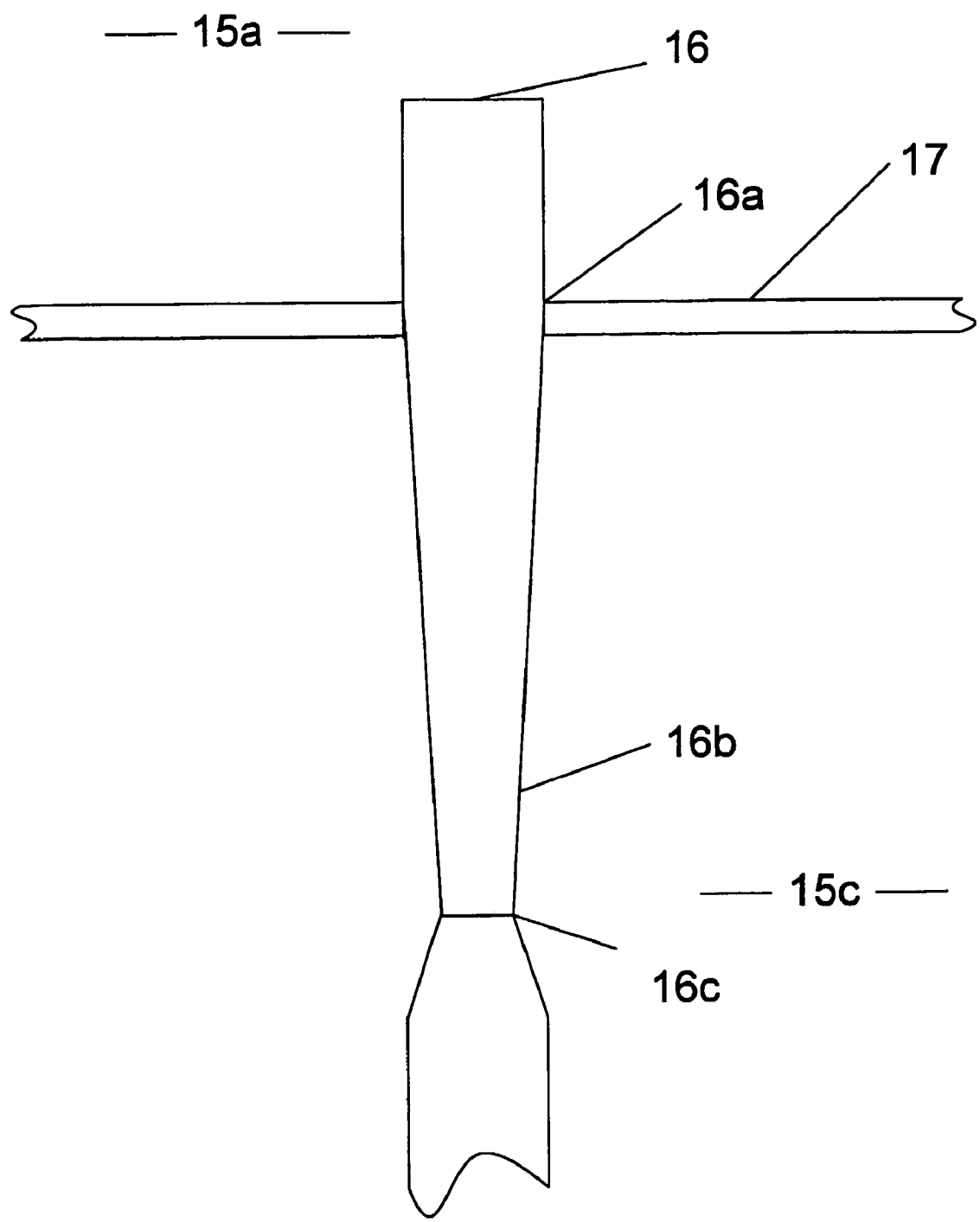
FIG. 2: shows, very diagrammatically, a valve with a tapered notch, with the taper of the notch exaggerated for clarity.

Referring next to FIG. 2, while the valve 16 between the third chamber 15a and second chamber 15c is shown schematically as having a valve head in FIG. 1, it is preferred that the valve 16 does not have a head or other protuberance which could pull the first diaphragm 17 of the controllable valving means onto the valve body 19 when the valve 16 moves downward. In a preferred embodiment the valve 16 may be slender, for example in the order of 1 mm in diameter, in order to minimise the force caused by the pressure of the gas in the third chamber 15a acting on the end of the valve 16.

The valve 16 may protrude through an orifice 16a in the first diaphragm 17 of substantially the same diameter as the valve 16. When a gas flow is required between the third chamber 15a and the first chamber 15b, a tapered notch 16b in the valve 16 may be moved into the orifice 16a to allow the gas to flow past the valve 16 as required. Releasing gas from the third chamber 15a to the second chamber 15c causes the first diaphragm 17 to move away from the valve body 19, thereby allowing gas to flow from the first chamber 15b through the valve body 19 to the second chamber 15c. This process is discussed in further detail below.

The notch 16b may preferably taper in to a waist 16c, with the side of the notch 16b which protrudes into the third chamber 15a being very gently tapered. In the embodiment illustrated the tapered side is around 5 mm long and tapers to a waist 16c of around 0.7 mm for example, although the maximum the valve 16 will lift will be around 4 mm. The notch 16b may preferably be tapered on the opposite side of the waist 16c as well in order to reduce the chance that that the valve 16 will fatigue, but this need not be such a gentle taper. The Applicant has found that tapered notches 16b may assist in reducing instability in the apparatus. Greater taper angles may decrease the response time of the apparatus at the expense of reduced stability, while lower taper angles will provide a more stable response.

Referring back to FIG. 1, the outlet of the control means 25 may preferably include an orifice 25b. Orifice 25b is sized so that when the flow through orifice 25b is at a maximum, the pressure downstream of orifice 25b is always less than 53% of the absolute pressure of the gas in the main inlet 14 and the first chamber 15b.

If the path between the orifice 25b and the engine is sufficiently unrestrictive that any gas which passes through orifice 25b would immediately be drawn away by the engine, an orifice 31 may be provided downstream of the control means orifice 25b to provide a sufficient restriction to allow some pressure to develop between orifice 25b and orifice 31 in response to the flow through the flow control means 25.

Orifice 31, if used, cannot be so small that the pressure downstream of orifice 25b can ever reach greater than 53% of the pressure of the gas in the first chamber 15b.

In view of the aforementioned pressure/rate of flow law, with this relationship between the inlet and outlet pressures, the rate of flow of gas through the flow control means 25, when open, will be a constant because the inlet pressure is a constant. The net flow will therefore be solely dependant on the control of the flow control means 25, i.e. on the on/off ratio, commonly called the "duty" cycle.

It will also be appreciated that due to the mentioned relationship between pressure and gas flow, if the control on the flow control means 25 is changed so that it operates at a higher duty, for example 10% as against 5% then the gas flow will double but the pressure in the chamber 24a will increase four fold, i.e. $2^2$. If the solenoid duty was increased three fold then the pressure in the chamber 24a would increase nine fold, i.e. $3^2$.

The pressure of the gas under the second diaphragm 20 is substantially the same as that at the solenoid outlet orifice 25b. An increase in pressure causes the second diaphragm 20 to lift and to actuate the valve 16 in the first diaphragm 17.

Gas in the third chamber 15a flows past the valve 16 into the second chamber 15c. This action reduces the gas pressure in the third chamber 15a which reduces pressure on the second side 17b of the first diaphragm 17 and causes the first diaphragm 17 of the controllable valving means to lift from the valve body 19. Gas then flows from the first chamber 15b into the second chamber 15c. The flow through the valve body 19 continues until the pressure in the second chamber 15c reaches equilibrium with the pressure in chamber 24a. This action prevents the valve 16 from opening further and the first diaphragm 17 lifts to a position where it closes valve 16.

As soon as valve 16 is closed, gas will pass from the first chamber 15b through a control orifice 18 into the third chamber 15a until pressure equilibrium is reached between those two chambers. This prevents the first diaphragm 17 from further travel and maintains a set open position of the controllable valving means. Gas flow between the first diaphragm 17 and valve body 19 is always kept at sonic choked flow, that is, the pressure in the second chamber 15c is always less than 53% of that in the first chamber 15b.

As the injector frequency or pulse width is reduced, the pressure on the second side 20b of the second diaphragm 20 is reduced and the gas in the fourth chamber 24a will drain via an orifice 31 into the main gas discharge port 33, lowering the pressure in the fourth chamber 24a. This reduction in pressure in the fourth chamber 24a causes the second diaphragm 20 to close valve 16, and the pressure in the second chamber 15c falls until it reaches equilibrium with the reduced pressure in the second chamber 24a. This action causes the first diaphragm 17 to reduce the opening of the controllable valving means until equilibrium is reached.

The output of the apparatus can be adjusted by a valve 32, which controls the mass flow rate out of the apparatus 100 for a given pressure in the second chamber 15c. The output can be adjusted over a wide range so that the same apparatus can be used for a range of vehicles, boilers or similar, with a large variation in the maximum fuel delivery required.

If greater flow is required then the size of the valve body 19 may be increased. The applicant has found that for automotive engines up to two litres a valve body 19 with around a 31 mm$^2$ effective cross-sectional area provides sufficient gas flow.

For automotive applications a minimum amount of gas is required for idle running. This can be adjusted by a screw 22 which limits the minimum opening of valve 16. The response time and sensitivity of the apparatus can be adjusted by a threaded spring base 23 which changes the pressure on a spring 21 located under diaphragm 20, which counteracts gas loading pressure on the valve 16.

In automotive applications the response of the system to rapid changes in gas demand may be assisted by a vacuum sensed acceleration stage 26.

When the vehicle is at light load, a relatively high vacuum is applied to the second spring side 27b of an acceleration stage diaphragm 27 via a port 29. The first side 27a of the acceleration stage diaphragm 27 is in fluid communication with the outlet of the flow control means 25, in this example via the fourth chamber 24a. The acceleration stage diaphragm 27 compresses a spring 28 on its second side 27b. The deflection of the acceleration stage diaphragm 27 towards its second side 27b increases the volume of a fifth chamber 24b, which is filled with gas from the fourth chamber 24a.

Under acceleration conditions, as the vacuum in the inlet manifold and the port 29 decreases, the spring 28 exerts an unbalanced force on the acceleration stage diaphragm 27, causing it to deflect in the direction of the first side 27a. The movement of the acceleration stage diaphragm 27 towards the first side 27a under the action of the spring 28 reduces the volume of the fourth chamber 24b, which results in a momentary increase in the pressure in chamber 24a, which results in the second diaphragm 20 lifting and a rapid lift of valve 16, with a resultant increase in gas flow out of the apparatus.

Those skilled in the art will appreciate that for turbocharged vehicles there may be a positive pressure in the inlet manifold rather than a vacuum, but the movement of the acceleration stage diaphragm 27 will be the same for the same relative upward or downward variation in manifold pressure described above.

The final gas output at the discharge distribution nozzle 33 is always maintained at a positive, that is, greater than atmospheric, pressure. In automotive applications an electrically operated lock off solenoid valve (not shown) may be situated over the valve 16 to prevent any gas passing out of the third chamber 15a when the engine is stopped. The first diaphragm 17 is therefore held down on the valve body 19, preventing any drain of gas from the system.

The electrically operated lock off solenoid valves may be isolated electrically as soon as the engine of the vehicle has stopped turning, even though the ignition system may be on. This feature is to meet specific vehicle safety standards for gas operated vehicles which require that the flow from such injections systems ceases automatically if the engine stops. These regulations may vary from country to country.

Those skilled in the art will appreciate that the present invention may be used with any suitable gas, for example Compressed Natural Gas (CNG), Methane, Liquid Petroleum Gas (LPG) and the like, with just the first stage regulator and the internal pressures being adjusted as required.

Those skilled in the art will also appreciate that the present invention may be particularly useful for retrofitting to fuel injected vehicles designed to run on petrol. The flow control means 25 may preferably be a solenoid with similar characteristics to the standard fuel injectors so that the vehicle's standard ECU and pulse width feed can be used to control the flow control means 25 without the ECU detecting a fault.

Figure 3:
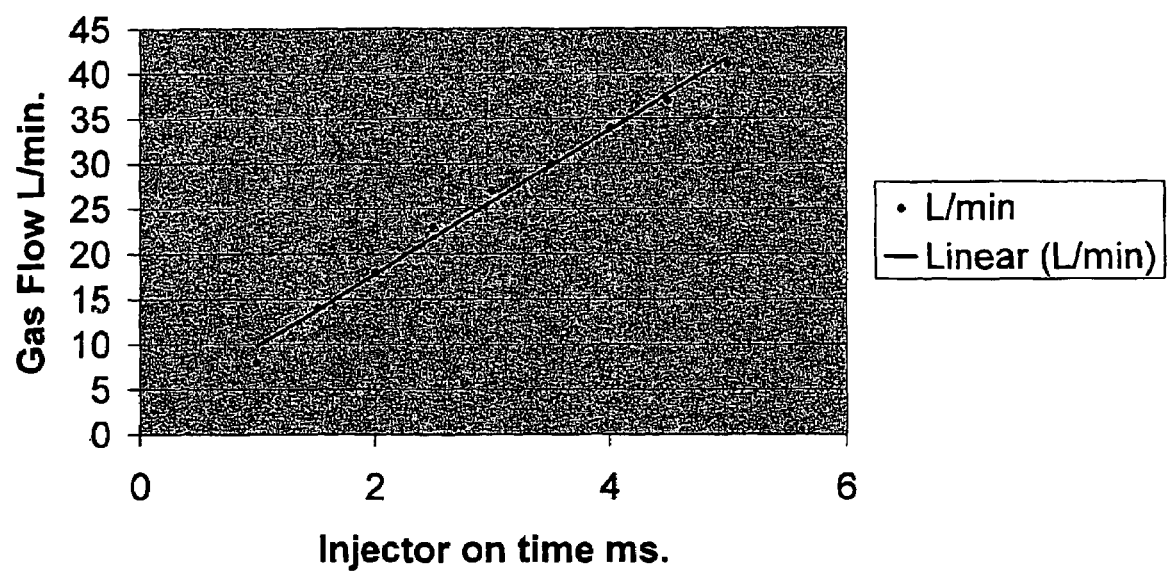
FIG. 3: is a graph of the gas flow out of the apparatus for a varying opening time of the flow control means at a constant idle engine speed.
Figure 4:
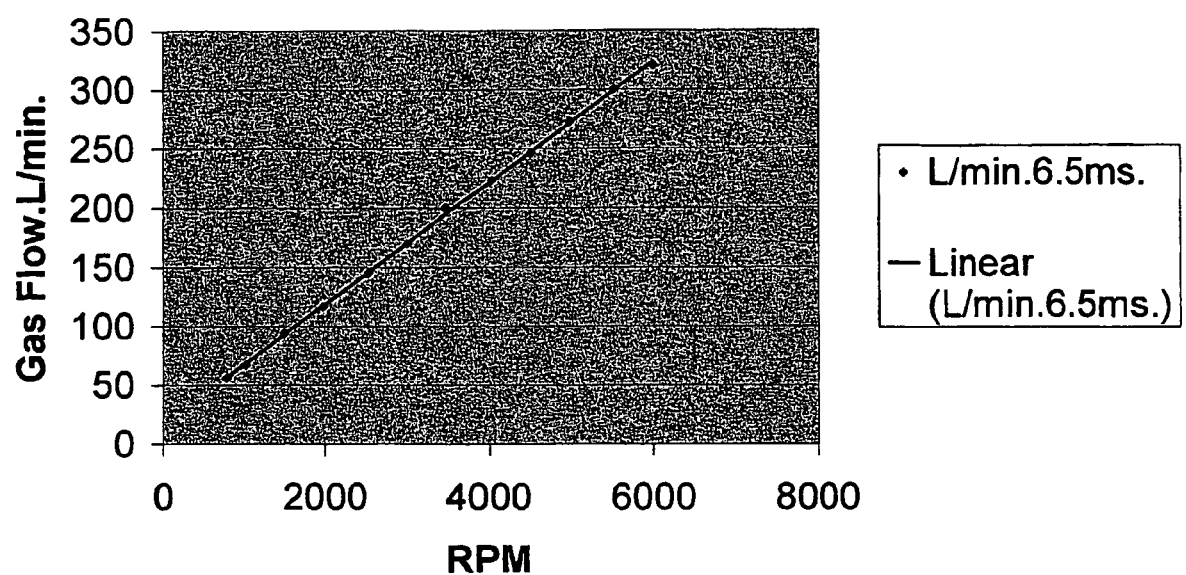
FIG. 4: is a graph of the gas flow out of the apparatus at varying engine speeds while keeping the opening time of the flow control means is constant at 6.5 ms.
Figure 5:
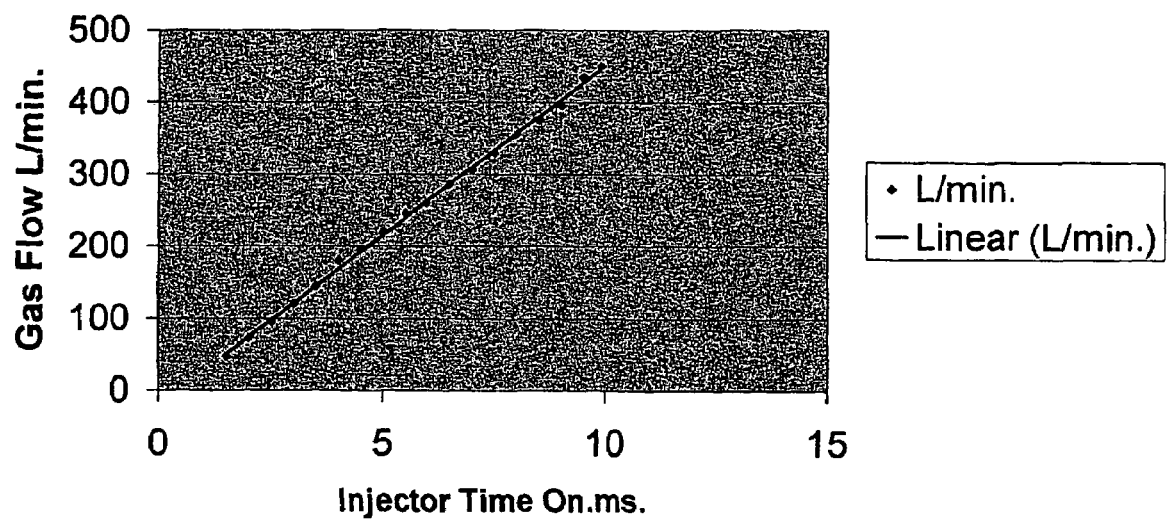
FIG. 5: is a graph of the gas flow out of the at a constant high engine speed with a varying opening time of the flow control means.

FIGS. 3 to 5 show results of one set of tests for a preferred embodiment of fuel injection apparatus of the present invention supplying gaseous fuel to an internal combustion engine.

FIG. 3 shows the gas flow out of the apparatus for a varying opening time of the flow control means at a constant idle engine speed.

FIG. 4 shows the gas flow produced by varying the engine speed with while keeping the opening time of the flow control means constant at 6.5 ms.

FIG. 5 shows the gas flow out of the apparatus at a constant high engine speed with a varying opening time of the flow control means.

As can be seen from FIGS. 3 to 5, the response of the apparatus is almost linear under each of these conditions.

Where in the foregoing description reference has been made to specific components or integers of the invention having known equivalents then such equivalents are herein incorporated as if individually set forth.

Although this invention has been described by way of example and with reference to possible embodiments thereof it is to be understood that modifications or improvements may be made thereto without departing from the scope or spirit of the invention.

The invention claimed is:

1. An apparatus for a gaseous fuel injection system including:
   (i) A first chamber including an inlet connectable with a source of gaseous fuel at a required inlet pressure;
   (ii) A second chamber connectable with an engine or other apparatus so as to supply gaseous fuel thereto and further connected with said first chamber through a controllable valving means;
   (iii) A flow control means having an inlet connectable with said first chamber and an outlet connectable with an orifice means for controlling the pressure at the outlet of said flow control means to be no more than 53% of the inlet pressure;
   (iv) Detection means for detecting said outlet pressure and controlling said valving means;
   (v) The arrangement being such that controlling the said flow control means to adjust the flow of gaseous fuel therethrough controls the said outlet pressure which in turn controls said controllable valving means and the pressure in said second chamber, so as to thereby control the flow of gaseous fuel to said engine or other apparatus.

2. The apparatus of claim 1 wherein, in use, the pressure in said second chamber is maintained at less than 53% of said pressure in said first chamber.

3. The apparatus of claim 1 or 2 wherein said fluid control means is a high speed solenoid valve.

4. The apparatus of claim 1 wherein said controllable valving means includes a valve body separating said first and second chambers and a first diaphragm having a first side in fluid communication with said first and said second chambers, said diaphragm adapted to provide a variable opening between said first side of said first diaphragm and said valve body for said gas to flow from said first chamber to said second chamber via said valve body, wherein said opening varies in response to said outlet pressure of said flow control means.

5. The apparatus of claim 4 wherein said first diaphragm includes a second side opposite said first side and in fluid communication with a third chamber, wherein said variable opening of said controllable valving means is varied by varying a pressure in said third chamber.

6. The apparatus of claim 5 wherein said pressure in said third chamber is varied by varying an opening of a valve between said third chamber and said second chamber.

7. The apparatus of claim 6 wherein said opening of said valve between said third chamber and said second chamber is controlled by a second diaphragm having a first side in fluid communication with said third chamber and a second side opposite said first side in fluid communication with a fourth chamber which is in fluid communication with gas from said outlet of said fluid control means.

8. The apparatus of claim 6 wherein said valve between said third chamber and said second chamber includes a needle with a tapered notch.

9. The apparatus of claim 7 or 8 including an acceleration stage diaphragm having a first side in fluid communication with said outlet of said flow control means and a second side opposite said first side in fluid communication with an intake manifold of said engine or other apparatus downstream of a throttle valve of said engine or other apparatus, wherein said acceleration stage diaphragm deflects towards said first side of said acceleration stage diaphragm when a pressure in said intake manifold increases, thereby increasing said pressure in said fourth chamber and increasing said opening of said variable valve.

10. The apparatus of claim 1 further comprising a feedback controlled regulator stage between said inlet and said first chamber.

11. The apparatus of claim 10 wherein said feedback controlled regulator stage includes a first second stage chamber having an second stage inlet, the first second stage chamber in fluid communication with a second second stage chamber via a second stage controllable valving means, an outlet from said second second stage chamber connectable with said first chamber, a second stage diaphragm controlling said second stage controllable valving means and in fluid communication with said second second stage chamber on a first side and a feedback chamber on an opposite second side, wherein a pressure of the gas in said feedback chamber is controlled by a feedback regulator means which varies said pressure in response to a pressure of the gas in said second stage outlet, thereby maintaining said pressure in said second stage outlet at a substantially constant pressure.

12. A method of controlling a flow of gaseous fuel in a fuel injection apparatus, said method including:
(i) Providing a first chamber connectable with a source of gaseous fuel at a required inlet pressure;
(ii) Providing a second chamber connectable with an engine or other apparatus and in gas flow connection with said first chamber through a controllable valving means;
(iii) Providing a flow control means having an inlet connected with said first chamber to receive gaseous fuel therefrom and an outlet connected with a first orifice means so adapted that the outlet pressure of said flow control means is no greater than 53% of the said inlet pressure;
(iv) Said method further including controlling said gaseous fuel flow using said flow control means, so as to control the said outlet pressure, detecting said outlet pressure, and controlling said valving means in response to said outlet pressure so as to control the pressure in said second chamber and thereby control the gaseous fuel flow to said engine or other apparatus from said second chamber.

13. The method of claim 12 including maintaining the pressure in said second chamber at less than 53% of the pressure in said first chamber.

14. The method of claim 12 wherein said flow control means is a high speed solenoid valve.

15. The method of claim 12, 13 or 14 wherein said controllable valving means includes a valve body provided between said first and second chambers and a first diaphragm adapted to control the flow between said first and second chambers through said valve body by means of a variable opening between said first diaphragm and said valve body, the method including varying said variable opening of said controllable valving means by varying a pressure on an opposite side of said diaphragm to said valve body.

16. The method of claim 12 including providing a feedback controlled regulator stage between said inlet and said first chamber.

17. An apparatus for a gaseous fuel injection system utilising the method of claim 12.

18. A feedback controlled regulator stage including a first chamber having an inlet connectable to a source of gas at a substantially constant pressure, the first chamber in fluid communication with a second chamber via a controllable valving means, an outlet from said second chamber, a second stage diaphragm controlling said controllable valving means and in fluid communication with said second chamber on a first side and a feedback chamber on an opposite second side, wherein a pressure of a gas in said feedback chamber is controlled by a feedback regulator means which varies said pressure in response to a pressure of the gas in said outlet, thereby maintaining said pressure in said outlet at a substantially constant pressure.

* * * * *